Feb. 28, 1928.
E. J. HIRVONEN
1,660,489
HIGH SPEED FRICTION DRIVE
Filed Feb. 27, 1926   3 Sheets-Sheet 2
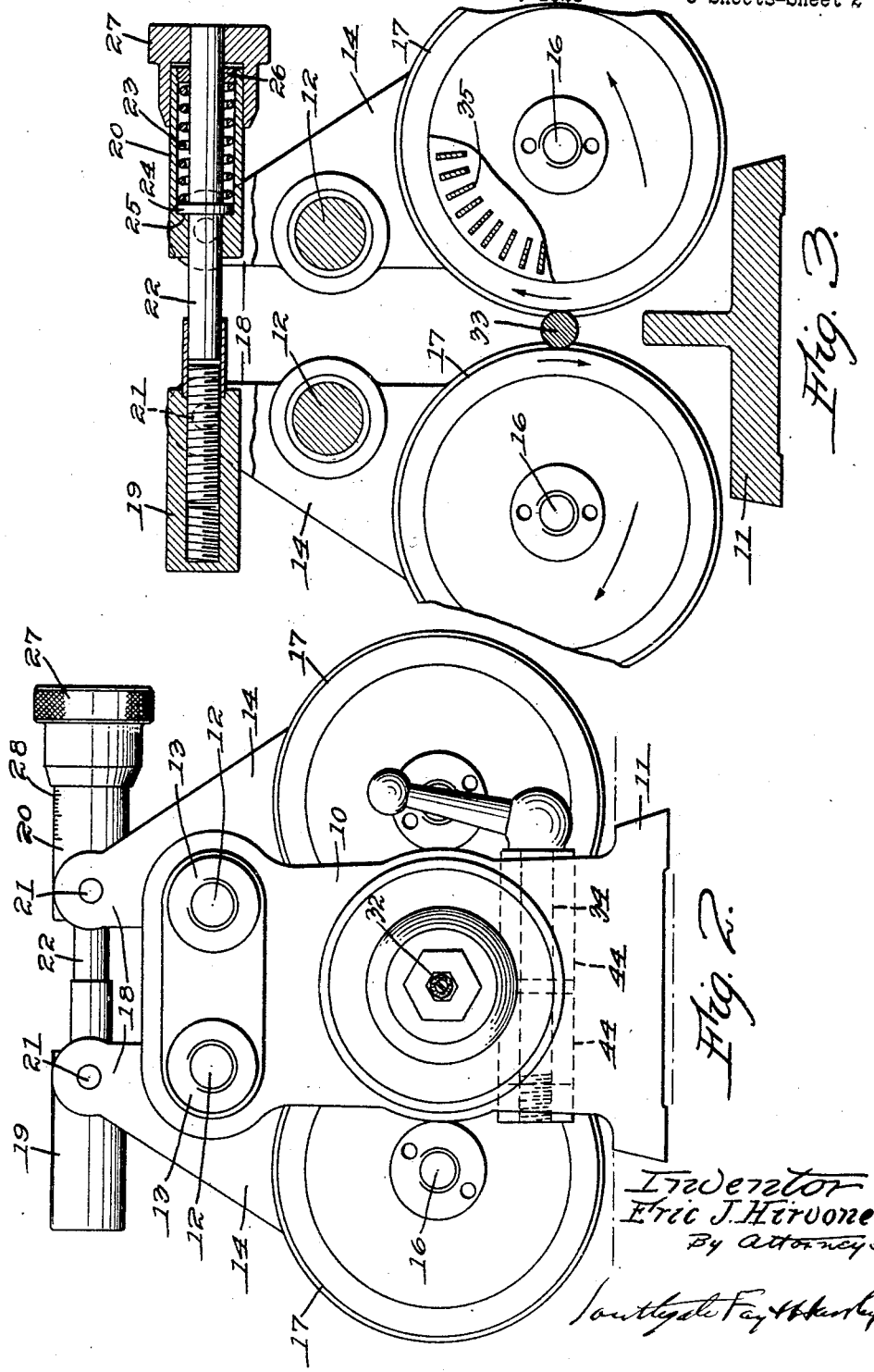

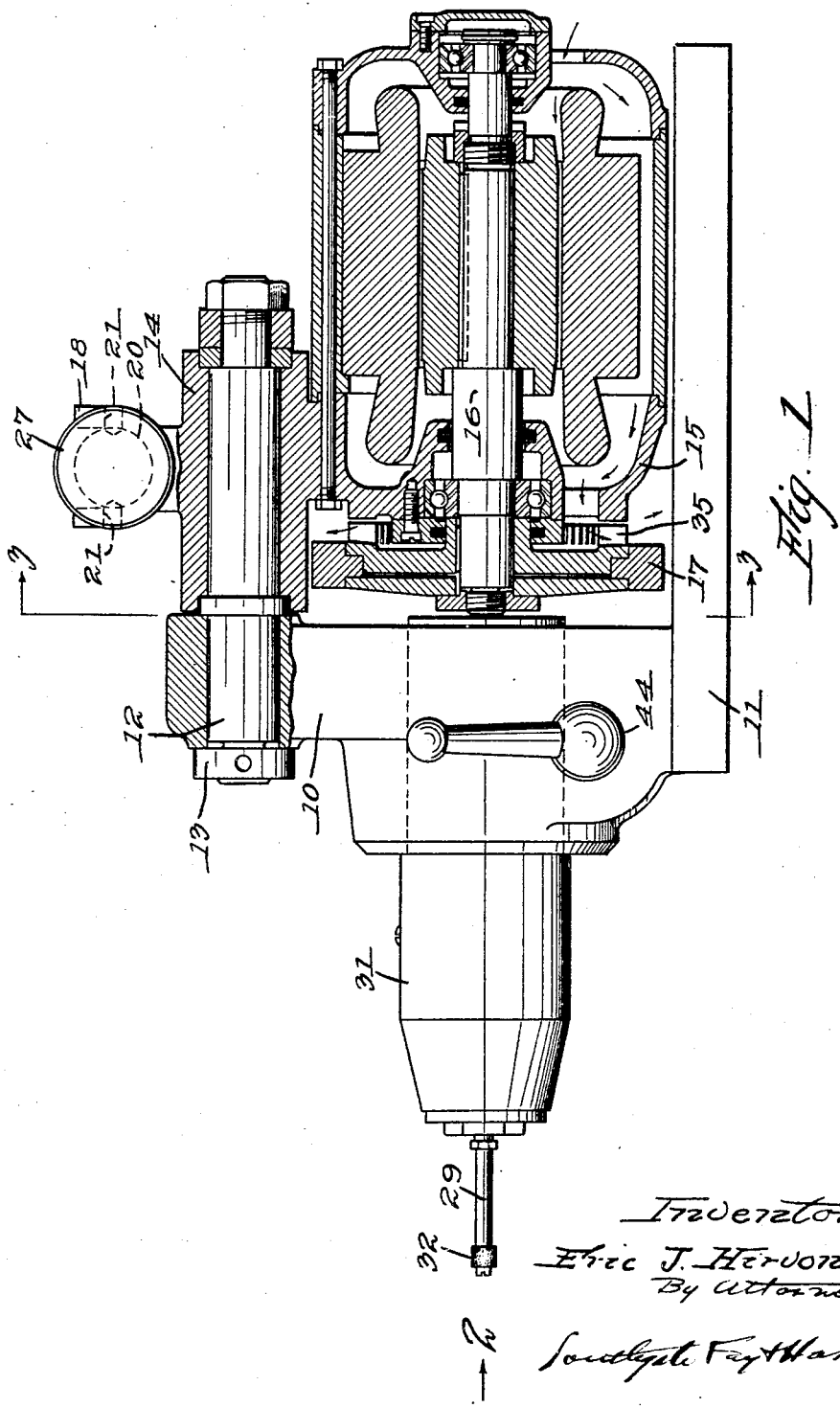

Feb. 28, 1928.
E. J. HIRVONEN
1,660,489
HIGH SPEED FRICTION DRIVE
Filed Feb. 27, 1926   3 Sheets-Sheet 3
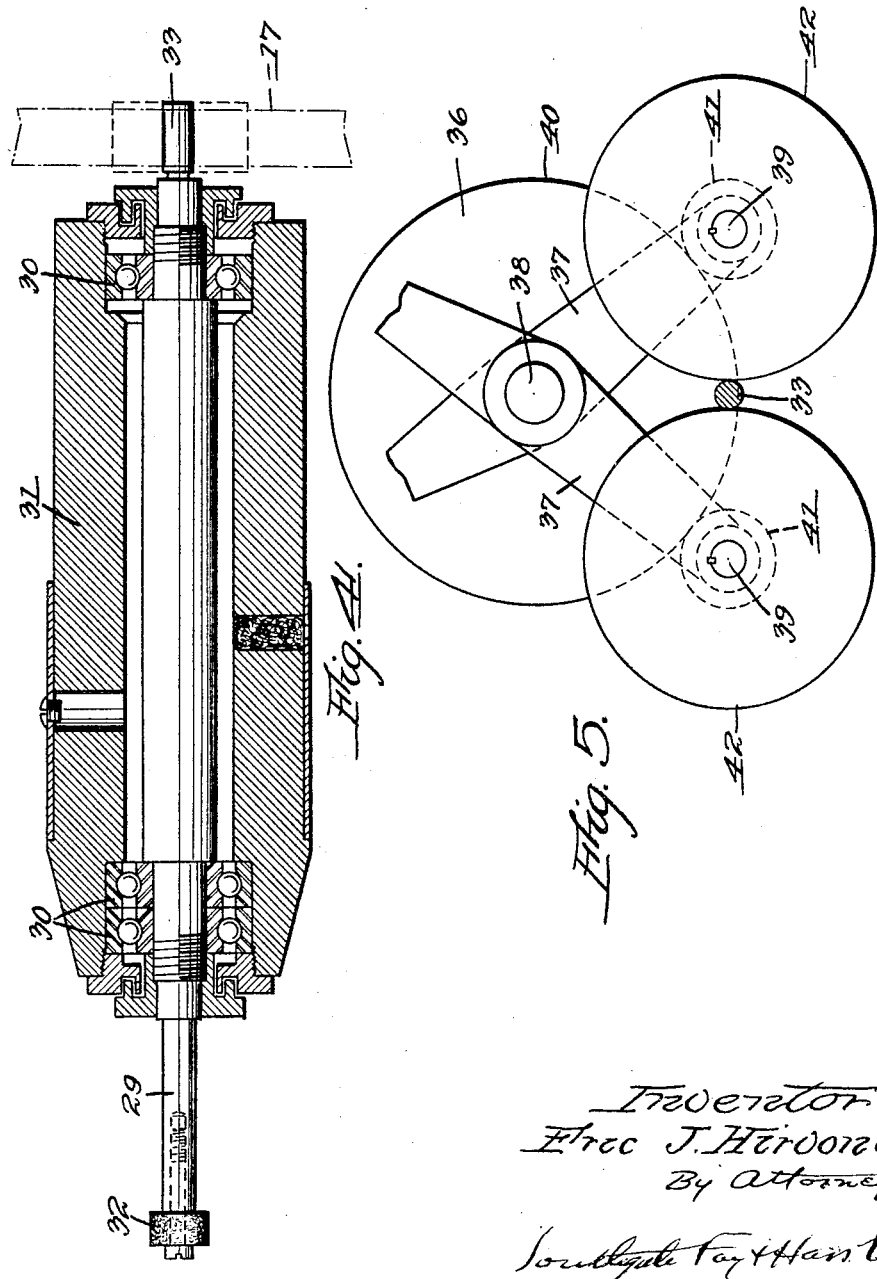

Patented Feb. 28, 1928.

1,660,489

UNITED STATES PATENT OFFICE.

ERIC J. HIRVONEN, OF WORCESTER, MASSACHUSETTS, ASSIGNOR TO LELAND-GIFFORD COMPANY, A CORPORATION OF MASSACHUSETTS.

HIGH-SPEED FRICTION DRIVE.

Application filed February 27, 1926. Serial No. 91,212.

This invention relates to means for driving a shaft or spindle at an extremely high speed.

The principal objects of the invention are to provide a drive that will attain an extremely high speed without any undue strain on the shaft or spindle, and bearings or vibrating thereof, and still maintain its power; to provide effective means for adjusting the plurality of driving wheels to drive pulleys of different sizes and to provide an air cooling system therefor.

It is used to advantage in grinding small holes, where a satisfactory finish requires an extremely high speed at the spindle to maintain the necessary peripheral cutting speed at the surface of the grinding wheel.

The invention also involves other features of construction as will appear.

Reference is to be had to the accompanying drawings in which

Fig. 1 is a side elevation of a machine embodying the invention, partly in section showing the driving mechanism;

Fig. 2 is a front elevation, see arrow 2 in Fig. 1;

Fig. 3 is a section, on the line 3—3 of Fig. 1, showing the manner of attaching the motors;

Fig. 4 is a central longitudinal section of the spindle holder; and

Fig. 5 is a modification showing a method of driving with one motor, within the scope of this invention.

The invention is shown as applied to a grinding head for internal grinding but it may be applied to any machine tool, for instance the spindle of a drill.

For this purpose a frame 10 is provided having a base 11 at right angles for mounting it on a grinder column, or any machine of that nature. Bolted to the frame 10 are two studs 12 held by nuts 13. On these studs 12 are pivoted two opposite brackets 14. The lower end 15 of each bracket is constructed to fit a motor in place of the usual end casting. It also serves as a bearing housing for the ball bearing in which the rotor shaft 16 of the motor runs. Mounted on the end of the shaft 16, and positively driven by it, is a pulley or friction driving wheel 17. Each friction driving wheel 17 has fins 35 extending out from the motor side to draw in the air through the motor, thus cooling the same. These two wheels 17 are adjustably spaced apart so as to bear with just the right pressure, on a pulley 33 on the grinding spindle 29. They rotate in opposite direction in contact with it and drive it at a high speed as will appear.

It will be noticed that the brackets 14 are of the same construction only opposite hand and that each bracket holds a motor. The motors are wired in the usual manner to rotate in the same direction.

The other end of the bracket 14 is forked at 18 and the two forks hold sleeves 19—20 pivoted by pins 21 in the arms of the forks 18. These sleeves 19 and 20 are connected by an adjusting screw 22 which is threaded into the sleeve 19 but is held in the sleeve 20 by a spring 23. This spring 23 forces a shoulder 24 on the screw 22 against a seat 25 in the sleeve 20. The spring 23 is held in the sleeve 20 by a nut 26. A knurled nut 27 is secured to the screw 22 at this end and by rotating this nut 27 the brackets 14 holding the motors are swung in an arc around the studs 12, either toward the center of the frame 10 or away from it. The sleeve 20 is graduated at 28 to show the pressure applied to the spring 23 as the adjusting screw 22 is tightened. The spring 23 also serves as a yielding means for equalizing the pressure of the wheels and centering them, which will be described later.

The driven spindle 29 is mounted in ball bearings 30 in a sleeve 31 and held rigidly thereon. On one end is the grinding wheel or cutter 32 and on the other, the driven pulley 33.

The sleeve 31 is clamped in the frame 10 by means of the usual clamp screw 34 in two bronze bushings 44. The pulley 33 extends in beyond the frame 10 and is held in the plane of the friction driving wheels 17.

Now, as the nut 27 is turned releasing the brackets 14 pivoted on the studs 12, the motors on the other ends of the brackets 12 are swung toward the center, it being understood that the brackets 14 holding the motors are in the out position before inserting the sleeve 31 in the frame 10. The pulleys 17 will now come in contact with the pulley 33 on the spindle 29. The spring 23 will yield allowing the driving wheels 17 to apply an even, balanced pressure on the pulley 33. This balanced pressure insures absolute rigidity of the shaft 29 upon which the grinding wheel or cutter is mounted, and puts no undue load on the bearings 30 in the sleeve 31. Because of this balanced drive of the wheels 17 on the pulley 33, there is very little loss of power as pressure is applied to the grinding wheel or cutter 32. The pulley 33 may be increased or decreased in diameter to produce the speed required, as the friction wheels 17 do not change in diameter. The spring 23 acts as a yielding centering device for the motors and the driving wheels. If one of them is located slightly nearer the pulley 33 than the other, this spring equalizes the pressure.

In Fig. 5 only one motor 36 is used. Brackets 37 floating on the rotor shaft 38 hold counter shafts 39. A driving wheel 40 on the rotor shaft 38 drives pulleys 41 on the counter shafts 39. Keyed to the counter shafts 39 also are driving wheels 42, which drive the spindle pulley 33 by friction. In like manner, as the brackets 37 are swung toward the center by the same adjusting screw 22, the wheel 40 always in contact with pulleys 41 on counter shafts 39 will cause the wheels 42 to drive the spindle pulley 33, it being understood that brackets 37 have spring yielding adjustment as described, in connection with the other figures.

In whatever form the invention is carried out the provision of the two motors rigidly mounted in the adjustable but rigid brackets, and having the large driving wheels contacting with the small driven pulley on opposite sides thereof, not only produces a very high speed in the latter, but prevents vibration and chattering, and also avoids undue strain on the rotating parts and bearings. This is particularly valuable in interior grinding for the reasons above mentioned.

Although I have illustrated and described only two forms of the invention I am aware of the fact that other modifications can be made therein by any person skilled in the art without departing from the scope of the invention as expressed in the claims.

Therefore I do not wish to be limited to the exact details of construction herein shown and described but what I do claim is:—

1. The combination with a grinding wheel having a small pulley rigidly mounted thereon, of a pair of driving wheels engaging the pulley at directly opposite points, said driving wheels having a materially greater diameter than the driven pulley to drive it at a high speed by friction on the surfaces thereof, separate means for rotating said driving wheels in the same direction at a high speed, and means whereby said driving wheels can be adjusted accurately to materially different distances apart to permit the use of different sized pulleys, without changing the drive.

2. In a spindle drive, the combination of a pair of driving wheels, a pair of motors for rotating said driving wheels in the same direction, said driving wheels having a friction surface, a pulley between them to be rotated by them, means for adjusting the driving wheels simultaneously toward or from each other, means on the driving wheels for creating currents of air through them and around the two motors to cool the parts and casings in which the motors are located having spaces around the motors and air inlets beyond the ends of the motors to direct the cooling currents.

In testimony whereof I have hereunto affixed my signature.

ERIC J. HIRVONEN.